United States Patent
Kim et al.

(10) Patent No.: US 8,651,255 B2
(45) Date of Patent: Feb. 18, 2014

(54) CLUTCH ACTUATING APPARATUS FOR DOUBLE CLUTCH TRANSMISSION

(75) Inventors: Jongyop Kim, Seoul (KR); Sungyong Cho, Hwaseong-si (KR); Hyunduk Chang, Seoul (KR)

(73) Assignee: Hyundai Motor Company, Seoul (KR)

( * ) Notice: Subject to any disclaimer, the term of this patent is extended or adjusted under 35 U.S.C. 154(b) by 447 days.

(21) Appl. No.: 13/007,383

(22) Filed: Jan. 14, 2011

(65) Prior Publication Data
US 2012/0125732 A1    May 24, 2012

(30) Foreign Application Priority Data

Nov. 23, 2010    (KR) .................. 10-2010-0117155

(51) Int. Cl.
*F16D 28/00* (2006.01)
*H02K 7/06* (2006.01)

(52) U.S. Cl.
USPC ....... 192/20; 192/84.6; 192/82 P; 192/111.12

(58) Field of Classification Search
USPC .............................................. 192/84.6, 82 P
See application file for complete search history.

(56) References Cited

U.S. PATENT DOCUMENTS

| | | | |
|---|---|---|---|
| 6,032,776 A * | 3/2000 | Imao | 192/84.6 |
| 7,219,571 B2 | 5/2007 | McCrary | |
| 7,334,671 B2 * | 2/2008 | Langwald | 192/84.6 |
| 7,658,261 B2 | 2/2010 | Pfund | |
| 8,051,965 B2 * | 11/2011 | Kim et al. | 192/20 |
| 2010/0108456 A1 | 5/2010 | Gerundt et al. | |
| 2011/0024252 A1 * | 2/2011 | Kim et al. | 192/48.2 |
| 2012/0090428 A1 * | 4/2012 | Bowen et al. | 74/665 D |

FOREIGN PATENT DOCUMENTS

| | | |
|---|---|---|
| KR | 10-0688352 B1 | 3/2007 |
| KR | 10-2009-0040075 A | 4/2009 |
| KR | 10-2009-0065282 A | 6/2009 |
| WO | WO 0053945 A1 * | 9/2000 ............. F16D 23/12 |
| WO | WO 03/081069 A1 | 10/2003 |
| WO | WO 2005/028900 A1 | 3/2005 |

\* cited by examiner

*Primary Examiner* — David D Le
*Assistant Examiner* — Jacob S Scott
(74) *Attorney, Agent, or Firm* — Morgan, Lewis & Bockius LLP

(57) ABSTRACT

A clutch actuating apparatus for a double clutch transmission, may include an operation rod that constructs an operation stroke for engaging a clutch while moving straight, an electric power unit that generates a rotational force, a straight converting unit that converts the rotational force of the electric power unit into a straight movement force for moving straight the operation rod, a supplement force supplying unit for increasing the straight movement force of the operation rod and removing increased straight movement force in accordance with whether the operation rod engages or disengages the clutch, a rod locating unit that changes a position of the operation rod relative to the straight converting unit, and a housing that accommodates the straight converting unit and the supplement force supplying unit and covers the operation rod with a portion exposed to the outside.

10 Claims, 4 Drawing Sheets

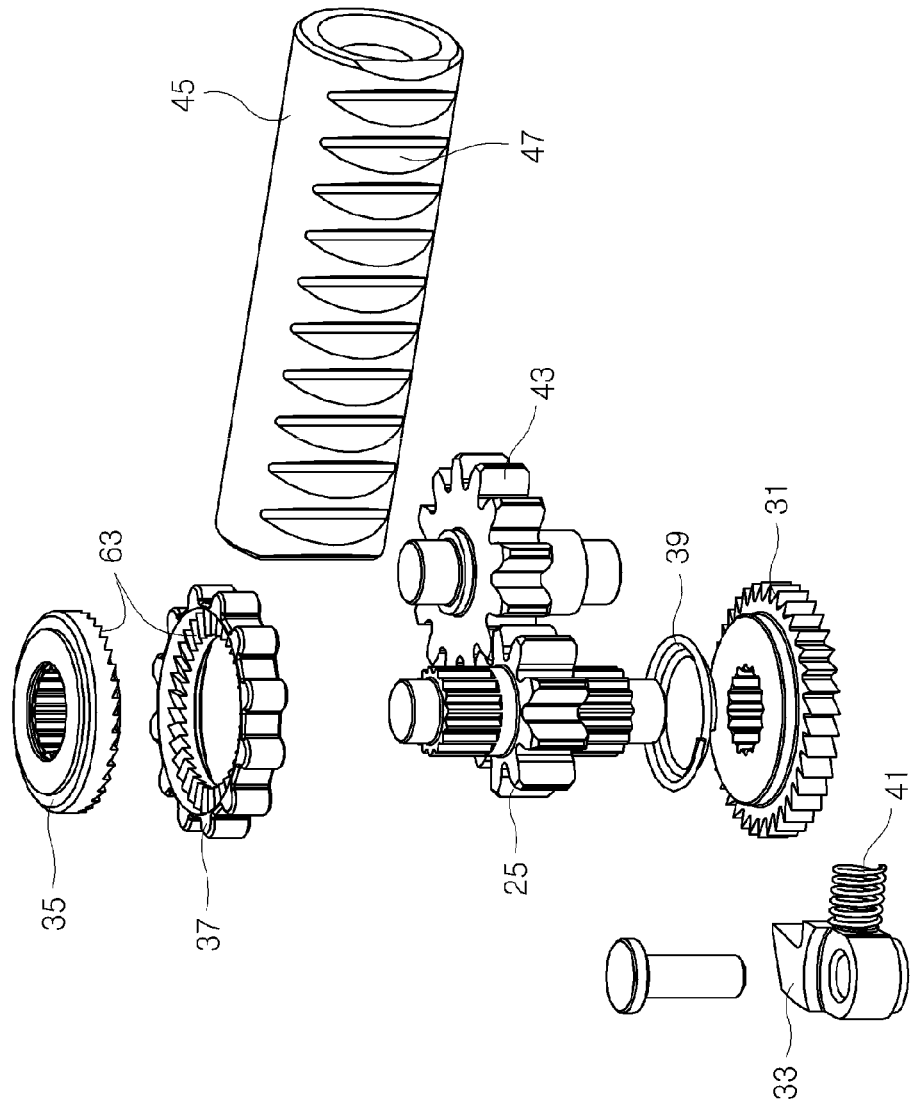

CLUTCH ACTUATING APPARATUS FOR DOUBLE CLUTCH TRANSMISSION

CROSS-REFERENCE TO RELATED APPLICATIONS

The present application claims priority to Korean Patent Application Number 10-2010-117155 filed Nov. 23, 2010, the entire contents of which application is incorporated herein for all purposes by this reference.

BACKGROUND OF THE INVENTION

1. Field of the Invention

The present invention relates to a clutch actuating apparatus for a double clutch transmission, and more particularly, to a technology about an actuator that respectively engages/disengages two clutches of a double clutch transmission.

2. Description of Related Art

Double clutch transmissions, different from a single clutch transmission systems of the related art, are shifting systems equipped with two clutches and designed to form separate shifting lines while one clutch connects/disconnects the gears of the odd-numbered stages and the other clutch connects/disconnects the gears of the even-numbered stages, which facilitate driving, such as automatic transmission, and achieve larger improvement of fuel efficiency than manual transmissions.

Further, double clutch transmissions allow for smooth shifting, because disconnection of acceleration, chattering and difference when gears are engaged, which are generated in transmissions equipped with a single clutch, do not occur.

The double clutch transmissions are provided with a pre-select function that engages in advance a shift gear of a shift stage in a next desired shift line other than the present shift stage, and directly shift only by changing the operation of the two clutches.

That is, with shift stages of two different shift lines engaged, respectively, the transmission ratio outputted from the transmission is changed in accordance with which clutch of the two clutches is engaged.

As described above, a clutch actuating apparatus for engaging a clutch should engage a clutch while being mechanically moved by electric operation or hydraulic operation, such that sufficient force for engaging the clutch should be applied to an apply bearing and a function of compensating frictional wear is required to compensate increase of the operational stroke when the clutch is worn.

Further, the clutch actuating apparatus requires a self-opening function that allows the clutch to be automatically disengaged in order to ensure safety in an emergency, such as when power of a vehicle is cut, and is usually attached to the outer side of a transmission case; therefore, it is required to be mounted in a small size in order not to protrude a lot out of the transmission case or occupy a large volume.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to provides a clutch actuating apparatus for a double clutch transmission that can engage a clutch with an electric power unit having a relatively small capacity, supply sufficient force for engaging the clutch to an apply bearing, provide an abrasion compensation function that allows the clutch to always stably and appropriately operate by automatically compensating the operation stroke when the clutch is worn, and a self-opening function that automatically disengages the clutch when power supplied to the electric power unit is cut.

Further, various aspects of the present invention are directed to provides a clutch actuating apparatus for a double clutch transmission that is configured to use common clutch mechanism provided with a separate clutch lever as it is, in order to implement clutch mechanism of a double clutch transmission using various parts and general technologies that have been developed in the related art, and has a simple and compact configuration to be easily mounted in a vehicle.

In an aspect of the present invention, the clutch actuating apparatus for a double clutch transmission, may include an operation rod that constructs an operation stroke for engaging a clutch while moving straight, an electric power unit that generates a rotational force, a straight converting unit that converts the rotational force of the electric power unit into a straight movement force for moving straight the operation rod, a supplement force supplying unit for increasing the straight movement force of the operation rod and removing increased straight movement force in accordance with whether the operation rod engages or disengages the clutch, a rod locating unit that changes a position of the operation rod relative to the straight converting unit, and a housing that accommodates the straight converting unit and the supplement force supplying unit and covers the operation rod with a portion exposed to the outside.

The electric power unit may include an electric motor, the straight converting unit may include a screw rotated by the electric motor, a nut block thread-coupled to the screw to move straight along the screw, and a nut guide formed to the housing and being slidably coupled to the nut block to guide the nut block to move straight by preventing rotation of the nut block, and the electric motor may be connected to be controlled by a controller that receives an output shaft velocity information of the double clutch transmission.

The rod locating unit may include a rod block slidably assembled to the housing so as to move straight with respect to the housing by receiving a straight movement force of the nut block, wherein the operation rod may be slidably coupled to the rod block and guides the operation rod to move straight and wherein the rod block may be coupled to the nut block, a pinion gear that may be rotatably mounted in the rod block to move straight the operation rod with respect to the rod block while rotating, a one-way clutch that may be rotatably mounted in the rod block to allow the pinion gear to rotate in a direction without reversing, and a clutch rotating unit that rotates the pinion gear by a predetermined angle in the direction allowed by the one-way clutch, when the rod block moves straight in a compensation section across an origin in a disengagement direction of the clutch.

The clutch rotating unit may include a latch gear that may be coaxially coupled to the pinion gear to rotate the pinion gear and may have a plurality of locking teeth, and a locking lever that may be mounted in the housing to rotate the latch gear by a predetermined amount, by being locked to the locking teeth by the rod block at regular intervals on an outer circumference thereof, when the rod block moves in the disengagement direction of the clutch, and wherein the controller controls the electric motor such that the rod block moves straight in the compensation section.

The one-way clutch may include a driving-sided dog coaxially fitted on a rotary shaft of the pinion gear by a spline, a fixing-sided dog disposed between the driving-sided dog and the pinion gear to be restricted in rotation by the rod block and allowed to move straight along the rotary shaft of the pinion gear, a return spring elastically supporting the fixing-sided dog against the driving-sided dog, and a plurality of wedged protrusions formed at regular intervals on surfaces facing each other of the fixing-sided dog and the driving-sided dog and engaged with each other to allow for one-directional rotation with respect to each other.

The one-way clutch may be disposed at one side of the pinion gear, the latch gear may be disposed at the other side of the pinion gear, a bias elastic member may be disposed between the locking lever and the housing to elastically support the locking lever against the latch gear, and an idler gear rotatably mounted to the rod block may be engaged with the pinion gear and transmits rotational force of the pinion gear to the operation rod for moving the operation rod straight.

The clutch actuating apparatus for the double clutch transmission may further include a carrier slidably coupled to the rod block and having a rack engaged with the idler gear on an outer surface thereof, wherein the operation rod may be coupled to the carrier.

The supplement force supplying unit may include a pressing slope that protrudes from a straight plane of the rod block, which may be parallel with a straight movement direction of the rod block, at an angle with respect to the straight movement direction, a pressing roller that continuously contacts with the straight plane or the pressing slope while the rod block moves straight, and a pressing elastic member disposed perpendicular to the straight plane of the rod block and applying an elastic force to the pressing roller.

The electric motor may be disposed opposite to a protrusion direction of the operation rod in the housing, and the electric motor, the straight converting unit, the rod block, and the supplement force supplying unit may be disposed on the same plane.

The rod block may have block extenders at both sides from the center of the rod block in a longitudinal direction of the operation rod, a plurality of rollers may be disposed between the block extenders and an inner wall of the housing to guide the block extender to move straight, the pressing slope of the supplement force supplying unit may be formed between the straight plane and the block extender formed in the protrusion direction of the operation rod in the block extenders, and a fixing protrusion that may be inserted and fixed in the nut block integrally protrudes from the rod block between the block extenders.

The controller monitors the timing of change in an output shaft velocity of the double clutch transmission and when an expected change in the output shaft velocity may be delayed over a predetermined level, the controller operates the rod locating unit.

The present invention can engage a clutch with an electric power unit having a relatively small capacity, supply sufficient force for engaging the clutch to an apply bearing, provide an abrasion compensation function that allows the clutch to always stably and appropriately operate by automatically compensating the operation stroke when the clutch is worn, and a self-opening function that automatically disengages the clutch when power supplied to the electric power unit is cut.

Further, the present invention is configured to use a common clutch mechanism provided with a separate clutch lever as it is, in order to implement a clutch mechanism of a double clutch transmission using various parts and general technologies that have been developed in the related art, and has a simple and compact configuration to be easily mounted in a vehicle.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIG. 4 is a view showing main parts of an exemplary embodiment of a rod locating unit of FIG. 1.

Figure 1:
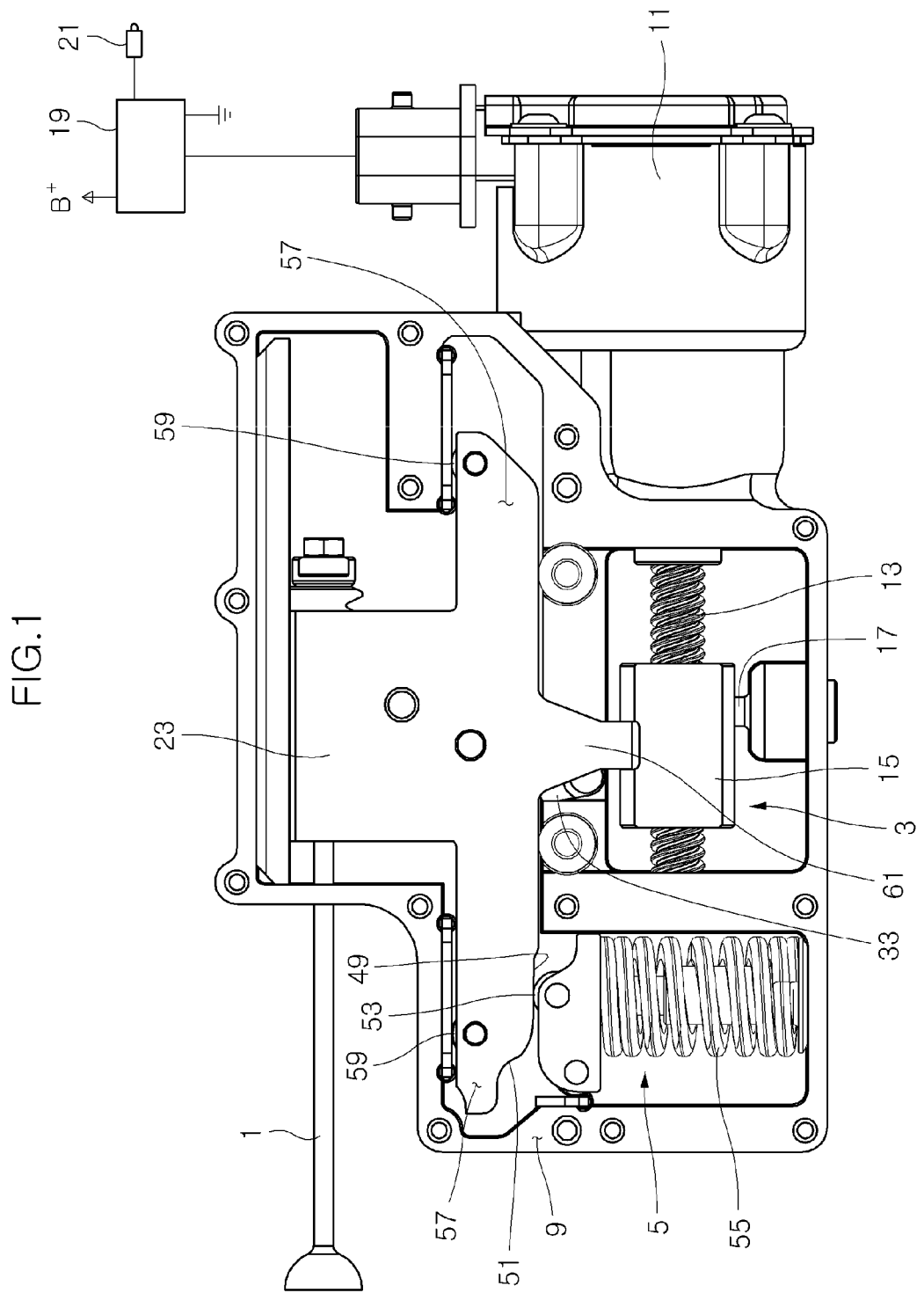
FIG. 1 is a view illustrating the structure of a clutch actuating apparatus for a double clutch transmission according to an exemplary embodiment of the present invention.
Figure 2:
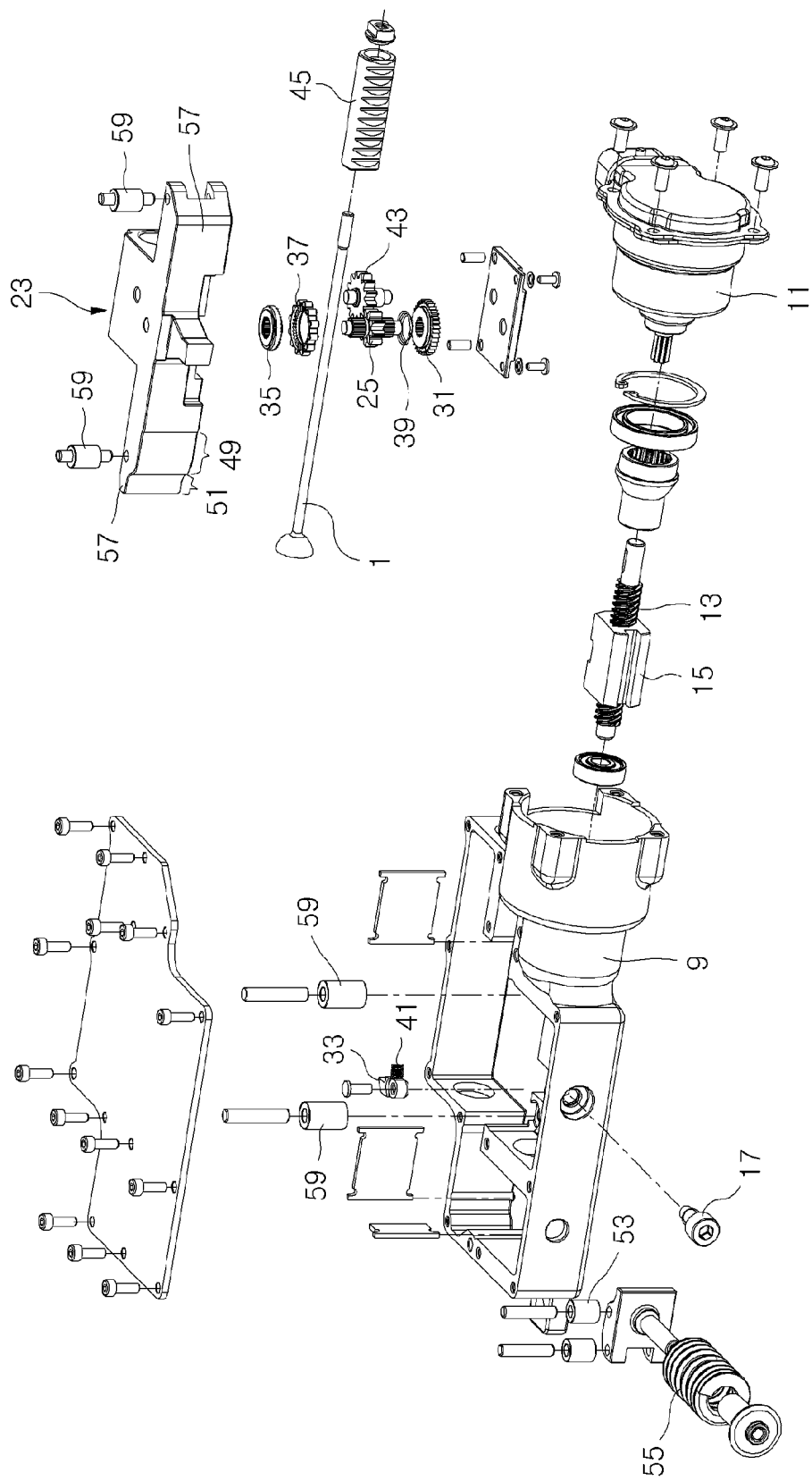
FIG. 2 is an exploded perspective view of FIG. 1.
Figure 3:
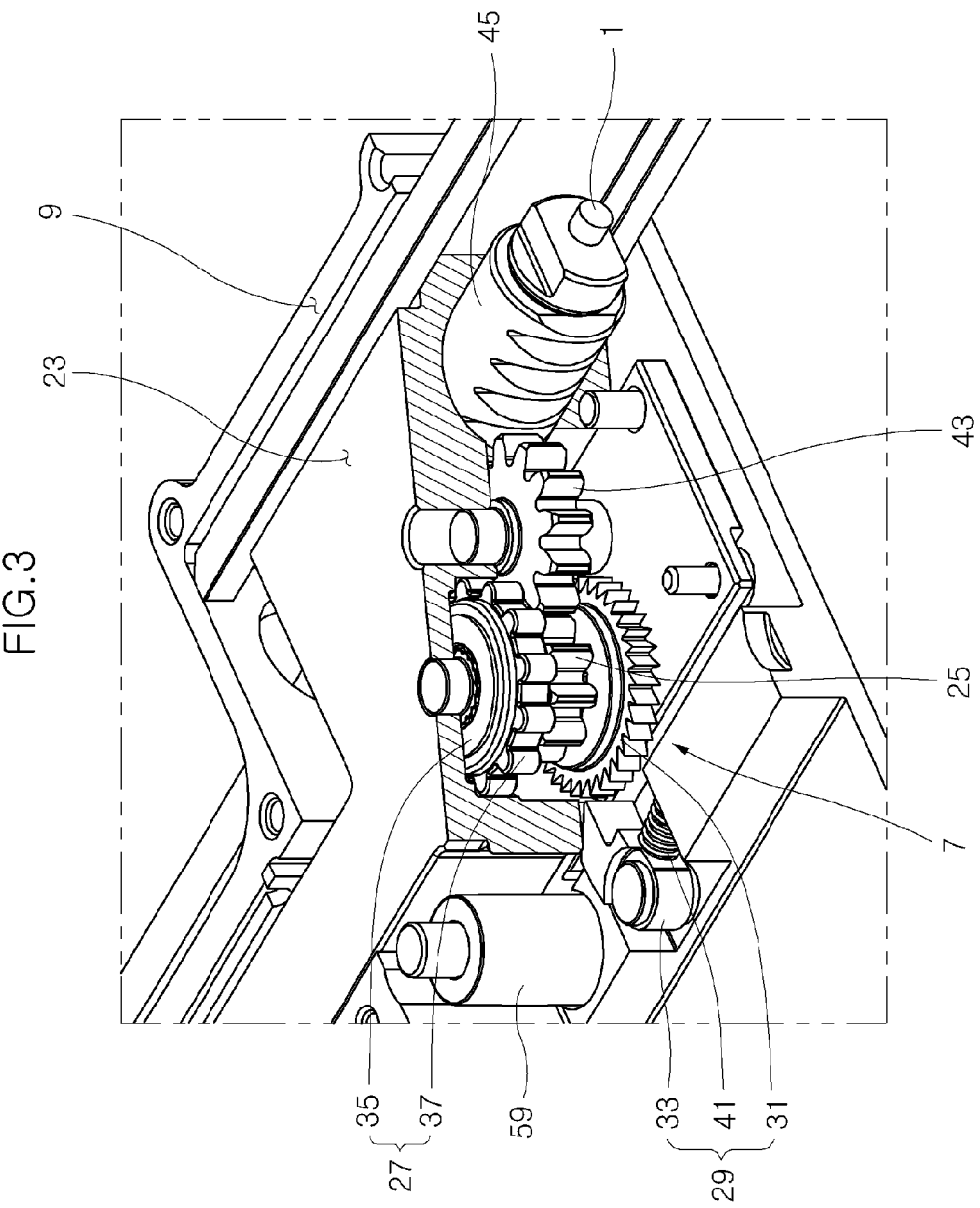
FIG. 3 is a view showing the structure of main parts of FIG. 1.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIGS. 1 to 4, a clutch actuating apparatus according to an exemplary embodiment of the present invention includes, an operation rod 1 that constructs an operation stroke for engaging a clutch while moving straight, an electric power unit that generates rotational force, a straight converting unit 3 that converts the rotational force of the electric power unit into straight movement force for moving straight operation rod 1, a supplement force supplying unit 5 that implements a state for increasing straight movement force of operation rod 1 and removing the increased straight movement force, in accordance with whether operation rod 1 engages/disengages the clutch, a rod locating unit 7 that changes the relative position of operation rod 1 to straight converting unit 3, and a housing 9 that accommodates straight converting unit 3 and supplement force supplying unit 5 and covers operation rod 1 with a portion exposed to the outside.

The electric power unit may be an electric motor 11. The straight converting unit 3 includes a screw 13 rotated by electric motor 11, a nut block 15 thread-fastened to screw 13 to move straight, and a nut guide 17 guiding nut block 15 to move straight by preventing rotation of nut block 15.

That is, as screw 13 is rotated by electric motor 11, nut block 15 moves straight along the spiral on screw 13 and nut guide 17 is inserted in a straight groove formed on nut block 15, such that nut block 15 is guided to move straight without rotating.

Electric motor 11 is connected to be controlled by a controller 19, which receives the output shaft velocity information of a double clutch transmission, and a velocity sensor 21 that measures the output shaft velocity of the transmission is connected to controller 19.

Rod locating unit 7 includes a rod block 23 that guides operation rod 1 to move straight and moves straight with respect to housing 9 by receiving straight movement force of nut block 15, a pinion gear 25 mounted in rod block 23 to move straight operation rod 1 with respect to rod block 23 while rotating, a one-way clutch 27 mounted in rod block 23 to allow pinion gear 25 to rotate in one direction without reversing, and a clutch rotating unit 29 rotating pinion gear 25 by a predetermined angle in the direction allowed by one-way clutch 27, when rod block 23 moves straight in a compensation section across the origin in the disengagement direction of the clutch.

The origin is the position where rod block 23 starts moving straight to engage the clutch, in which rod block 23 returns to the origin when the clutch is disengaged, and the compensation section implies a predetermined straight distance where rod block 23 moves straight from the origin in the disengagement direction of the clutch such that clutch rotating unit 29 operates.

Clutch rotating unit 29 includes a latch gear 31 that is coaxially coupled to pinion gear 25 to rotate pinion gear 25 and has a plurality of locking teeth at regular intervals on the outer circumference and a locking lever 33 that is mounted in housing 9 to rotate latch gear 31 by a predetermined amount, by being locked to the locking teeth, when rod block 23 moves in the compensation section in the disengagement direction of the clutch. Controller 19 can control electric motor 11 such that rod block 23 moves straight in the compensation section.

One-way clutch 27 includes a driving-sided dog 35 coaxially fitted on the rotary shaft of pinion gear 25 by a spline, a fixing-sided dog 37 disposed between driving-sided dog 35 and pinion gear 25 to be restricted in rotation by rod block and allowed to move straight along the rotary shaft of pinion gear 25, and a return spring 39 elastically supporting fixing-sided dog 37 against driving-sided dog 35, in which a plurality of wedged protrusions 63 is formed at regular intervals on the surfaces facing each other of fixing-sided dog 37 and driving-sided dog 35 and engaged with each other to allow for one-directional rotation with respect to each other.

One-way clutch 27 is disposed at one side of pinion gear 25, latch gear 31 is disposed at the other side of pinion gear 25, a bias elastic member 41 is disposed between locking lever 33 and housing 9 to elastically support locking lever 33 against latch gear 31, and an idler gear 43, which transmits power for moving operation rod 1 straight, using rotational force from pinion gear 25, is engaged with pinion gear 25.

That is, it is possible to implement a more stable and durable configuration by separately and symmetrically disposing one-way clutch 27 and latch gear 31 at both sides of pinion gear 25 and it is possible to dispose one-way clutch 27 and latch gear 31 closer to pinion gear 25 and achieve a more compact configuration by making it possible to output the rotational force of pinion gear 25 through idler gear 43.

Operation rod 1 is integrally inserted and fixed in a carrier 45 and a rack 47 is formed on the surface of carrier 45, such that rack 47 is engaged with idler gear 43 and accordingly the rotational force of pinion gear 25 is transmitted and operation rod 1 moves straight.

Therefore, when operation rod 1 is deformed or damaged by a long time use, a new operation rod 1 can be fixed in carrier 45, such that maintenance becomes easy.

Supplement force supplying unit 5 includes: a pressing slope 51 that protrudes from a straight plane 49 of rod block 23, which is parallel with the straight movement direction of rod block 23, at an angle with respect to the straight movement direction, a pressing roller 53 that continuously contacts with straight plane 49 and pressing slope 51 while rod block 23 moves straight, and a pressing elastic member 55 that applies elastic force, which is perpendicular to straight plane 49 of rod block 23, to pressing roller 53.

That is, as rod block 23 moves straight to engage the clutch and pressing roller 53 moves to contact with pressing slope 51 from straight plane 49 of rod block 23, the force applied from pressing roller 53 to rod block 23 is divided into the straight motion direction of rod block 23 by pressing slope 51 and added to the straight motion force of rod block 23 which is supplied from electric motor 11. Therefore, the straight motion force of operation rod 1 is increased and pressing roller 53 contacts with straight plane 49 of rod block 23 while rod block 23 moves to disengage the clutch and returns to the origin, such that the divided force supplied from pressing roller 53 in the straight motion direction of rod block 23 is completely removed.

The operation of increasing the straight movement force of operation rod 1 when pressing roller 53 contacts with pressing slope 51 makes it possible to minimally use the electromotive force for electric motor 11 and maintain stable stop position of operation rod 1 while the clutch maintains the engagement, such that stable engagement of the clutch can be ensured.

The sum of the straight motion force of operation rod 1 which is supplied from electric motor 11 and straight movement force from supplement force supplying unit 5 keeps the clutch in stable engagement, however, when the force supplied from electric motor 11 is removed and only the force from supplement force supplying unit 5 is exerted, due to a failure of the power unit of a vehicle, the clutch is disengaged and power transmission is stopped in the vehicle, such that it is required to implement a self-opening function for ensuring stability of the vehicle. Therefore, the force applied to the clutch from supplement force supplying unit 5 through operation rod 1 should be set smaller than the elastic force exerted in the clutch such that the clutch is disengaged.

Obviously, the leads of screw 13 and nut block 15 should be sufficiently large such that screw 13 can be reversed by the straight movement force from nut block 15, in order to implement the self-opening function.

Electric motor 11 is disposed opposite to the protrusion direction of operation rod 1 in housing 9, and electric motor 11, straight converting unit 3, rod block 23, and supplement force supplying unit 5 are disposed on one plane.

The arrangement described above makes more compact the clutch actuator apparatus for a double clutch transmission of the present invention, such that the clutch actuating apparatus can be more easily mounted to the transmission.

That is, according to the structures of common transmission, the size gradually decreases toward the rear from the front where the clutch housing is disposed, whereas operation rod 1 protrudes toward the clutch housing at the front of the transmission such that operation rod 1 is more easily connected to the clutch in the clutch housing while operation rod 1 having a relatively small volume faces the front of the transmission and electric motor 11 having a relatively large volume is positioned at the rear of the transmission in an exemplary embodiment of the present invention. Therefore, the clutch actuating apparatus of the present invention can be coupled to the transmission substantially in one unit without protruding a lot from the side of the transmission and the spatial limit for installing the transmission can be reduced.

Rod block 23 has block extenders 57 at both sides from the center in the longitudinal direction of operation rod 1, a plurality of rollers 59 is disposed between block extenders 57 and the inner wall of housing 9 to guide block extender 57 to move straight, pressing slope 51 of supplement force supplying unit 5 is formed at the front end of block extender 57 in the protrusion direction of operation rod 1 in block extenders 57, and a fixing protrusion 61 that is inserted and fixed in nut block 15 protrudes between block extenders 57.

The operation of an exemplary embodiment having the above configuration according to an exemplary embodiment of the present invention is described hereafter.

Power is supplied to electric motor 11 such that screw 13 rotates, and nut block 15 is guided by nut guide 17 to move straight to the right in FIG. 1, in order that controller 19 engages the clutch.

The straight movement of nut block 15 is transmitted to rod block 23 and rod block 23 and operation rod 1 move to the right and operate the lever of the clutch connected to operation rod 1, thereby engaging the clutch.

In this operation, as the amount of straight movement of rod block 23 increases, pressing roller 53 contacts with pressing slope 51 and provides the elastic force of pressing elastic member 55 in the straight movement direction of rod block 23.

When the clutch is engaged, the engagement of the clutch is stably maintained by the force provided by pressing elastic member 55 while the electromotive force provided for electric motor 11 is minimally maintained. When the electricity that has been supplied to electric motor 11 is cut, the force applied to operation rod 1 correspondingly decreases and nut block 15 moves backward while rotating screw 13 by the reaction force applied to operation rod 1 from the inside of the clutch, and accordingly, the clutch is automatically disengaged and power transmission is stopped, such that it is possible to ensure safety of a vehicle when the power unit of the vehicle suddenly fails.

On the other hand, when it is required to normally disengage the clutch, as controller 19 reverses electric motor 11, nut block 15 and rod block 23 move straight to the left and return to the origin, pressing roller 53 moves up along pressing slope 51 and contacts with straight plane 49 of rod block 23, and operation rod 1 moves with rod block 23, and consequently, the clutch is disengaged.

While the clutch is repeatedly engaged and disengaged as described above, the clutch is worn and the frictional wear should be appropriately compensated. Accordingly, controller 19 receives output shaft velocity information of the double clutch transmission from velocity sensor 21 and compensates the frictional wear of the clutch using rod locating unit 7.

That is, controller 19 drives electric motor 11 to engage the clutch and then monitors the timing of change in the output shaft velocity of the double clutch transmission, in which when an expected change in the output shaft velocity is delayed over a predetermined level, controller 17 determines that the delay is due to frictional wear of the clutch, such that it operates rod locating unit 7.

As controller 19 controls electric motor 11 and rod block 23 moves straight in the compensation section from the origin, the locking teeth of latch gear 31 are locked to locking lever 33 by the movement of rod block 23, pinion gear 25 and driving-sided dog 35 of one-way clutch 27 are rotated by the rotation of latch gear 31, and idler gear 43 engaged with pinion gear 25 moves rack 47 of carrier 45 while rotating, such that operation rod 1 is further moved straight to the right with respect to rod block 23, thereby compensating abrasion of the clutch.

Obviously, driving-sided dog 35 can rotate because as driving-sided dog 35 is rotated by the inclination of wedged protrusions 63, fixing-sided dog 37 axially moves straight while contracting return spring 39.

As driving-sided dog 35 rotates, as described above, the rotational position is fixed in the reverse direction by the elastic force of return spring 39 and wedged protrusions 63 between driving-sided dog 35 and fixing-sided dog 37, such that operation rod 1 can be stably kept at the position.

Obviously, when rod block 23 returns to the origin, which is the initial position, after moving along the compensation section, locking lever 33 is elastically supported against latch gear 31 such that it can be locked to the next locking tooth of latch gear 31 by bias elastic member 41.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A clutch actuating apparatus for a double clutch transmission, comprising:

an operation rod that constructs an operation stroke for engaging a clutch while moving straight;

an electric power unit that generates a rotational force;

a straight converting unit that converts the rotational force of the electric power unit into a straight movement force for moving straight the operation rod;

a supplement force supplying unit for increasing the straight movement force of the operation rod and removing increased straight movement force in accordance with whether the operation rod engages or disengages the clutch;

a rod locating unit that changes a position of the operation rod relative to the straight converting unit; and a housing that accommodates the straight converting unit and the supplement force supplying unit and substantially covers the operation rod with a portion of the operation rod extending outside of the housing;

wherein:

the electric power unit includes an electric motor;

the straight converting unit includes a screw rotated by the electric motor, a nut block thread-coupled to the screw to move straight along the screw, and a nut guide formed to the housing and being slidably coupled to the nut block, to guide the nut block to move straight by preventing rotation of the nut block; and the electric motor is connected to be controlled by a controller that receives an output shaft velocity information of the double clutch transmission.

2. The clutch actuating apparatus for the double clutch transmission as defined in claim 1, wherein the rod locating unit includes:
  a rod block slidably assembled to the housing so as to move straight with respect to the housing by receiving a straight movement force of the nut block, wherein the operation rod is slidably coupled to the rod block and guides the operation rod to move straight and wherein the rod block is coupled to the nut block;
  a pinion gear that is rotatably mounted in the rod block to move the operation rod straight with respect to the rod block while rotating;
  a one-way clutch that is rotatably mounted in the rod block to allow the pinion gear to rotate in a direction without reversing; and
  a clutch rotating unit that rotates the pinion gear by a predetermined angle in the direction allowed by the one-way clutch, when the rod block moves straight in a compensation section across an origin in a disengagement direction of the clutch.

3. The clutch actuating apparatus for the double clutch transmission as defined in claim 2, wherein the clutch rotating unit includes:
  a latch gear that is coaxially coupled to the pinion gear to rotate the pinion gear and has a plurality of locking teeth; and
  a locking lever that is mounted in the housing to rotate the latch gear by a predetermined amount, by being locked to the locking teeth by the rod block at regular intervals on an outer circumference thereof, when the rod block moves in the disengagement direction of the clutch, and
  wherein the controller controls the electric motor such that the rod block moves straight in the compensation section.

4. The clutch actuating apparatus for the double clutch transmission as defined in claim 3, wherein the one-way clutch includes: a driving-sided dog coaxially fitted on a rotary shaft of the pinion gear by a spline;
  a fixing-sided dog disposed between the driving-sided dog and the pinion gear to be restricted in rotation by the rod block and allowed to move straight along the rotary shaft of the pinion gear;
  a return spring elastically supporting the fixing-sided dog against the driving-sided dog, and
  a plurality of wedged protrusions formed at regular intervals on surfaces facing each other of the fixing-sided dog and the driving-sided dog and engaged with each other to allow for one-directional rotation with respect to each other.

5. The clutch actuating apparatus for the double clutch transmission as defined in claim 4, wherein:
  the one-way clutch is disposed at one side of the pinion gear;
  the latch gear is disposed at the other side of the pinion gear;
  a bias elastic member is disposed between the locking lever and the housing to elastically support the locking lever against the latch gear; and
  an idler gear rotatably mounted to the rod block is engaged with the pinion gear and transmits rotational force of the pinion gear to the operation rod for moving the operation rod straight.

6. The clutch actuating apparatus for the double clutch transmission as defined in claim 5, further comprising a carrier slidably coupled to the rod block and having a rack engaged with the idler gear on an outer surface thereof, wherein the operation rod is coupled to the carrier.

7. The clutch actuating apparatus for the double clutch transmission as defined in claim 2, wherein the supplement force supplying unit includes:
  a pressing slope that protrudes from a straight plane of the rod block, which is parallel with a straight movement direction of the rod block, at an angle with respect to the straight movement direction;
  a pressing roller that continuously contacts with the straight plane or the pressing slope while the rod block moves straight; and
  a pressing elastic member disposed perpendicular to the straight plane of the rod block and applying an elastic force to the pressing roller.

8. The clutch actuating apparatus for the double clutch transmission as defined in claim 7, wherein the electric motor is disposed opposite to a protrusion direction of the operation rod in the housing, and
  the electric motor, the straight converting unit, the rod block, and the supplement force supplying unit are disposed on a common plane.

9. The clutch actuating apparatus for the double clutch transmission as defined in claim 8, wherein:
  the rod block has block extenders at both sides from the center of the rod block in a longitudinal direction of the operation rod;
  a plurality of rollers is disposed between the block extenders and an inner wall of the housing to guide the block extender to move straight;
  the pressing slope of the supplement force supplying unit is formed between the straight plane and the block extender formed in the protrusion direction of the operation rod in the block extenders; and
  a fixing protrusion that is inserted and fixed in the nut block integrally protrudes from the rod block between the block extenders.

10. The clutch actuating apparatus for the double clutch transmission as defined in claim 1, wherein the controller monitors the timing of change in an output shaft velocity of the double clutch transmission and when an expected change in the output shaft velocity is delayed over a predetermined level, the controller operates the rod locating unit.

* * * * *